W. F. DOHERTY, Jr.
SUBMARINE BOAT.
APPLICATION FILED AUG. 14, 1915.
1,192,172.
Patented July 25, 1916.
3 SHEETS—SHEET 1.
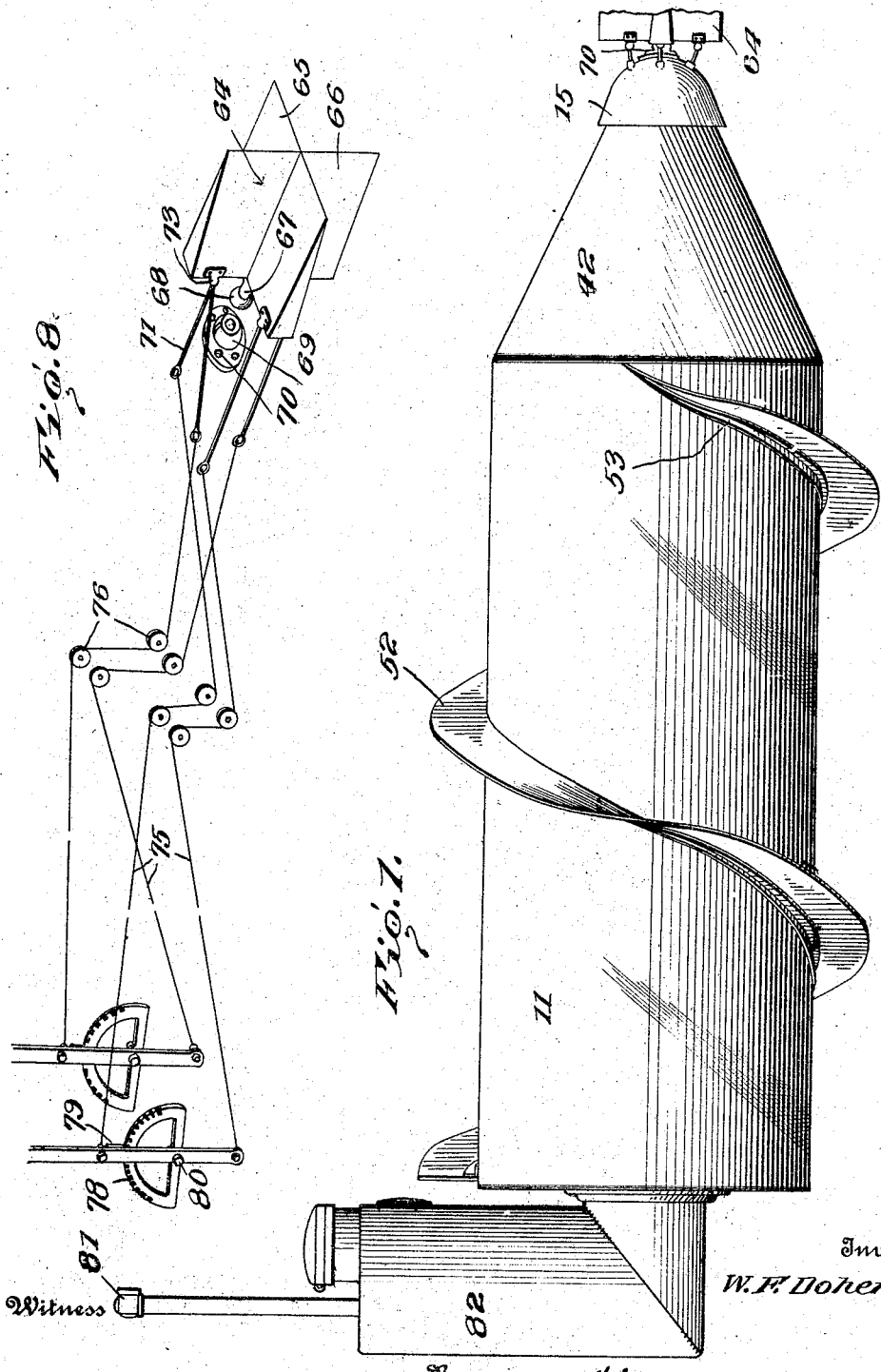

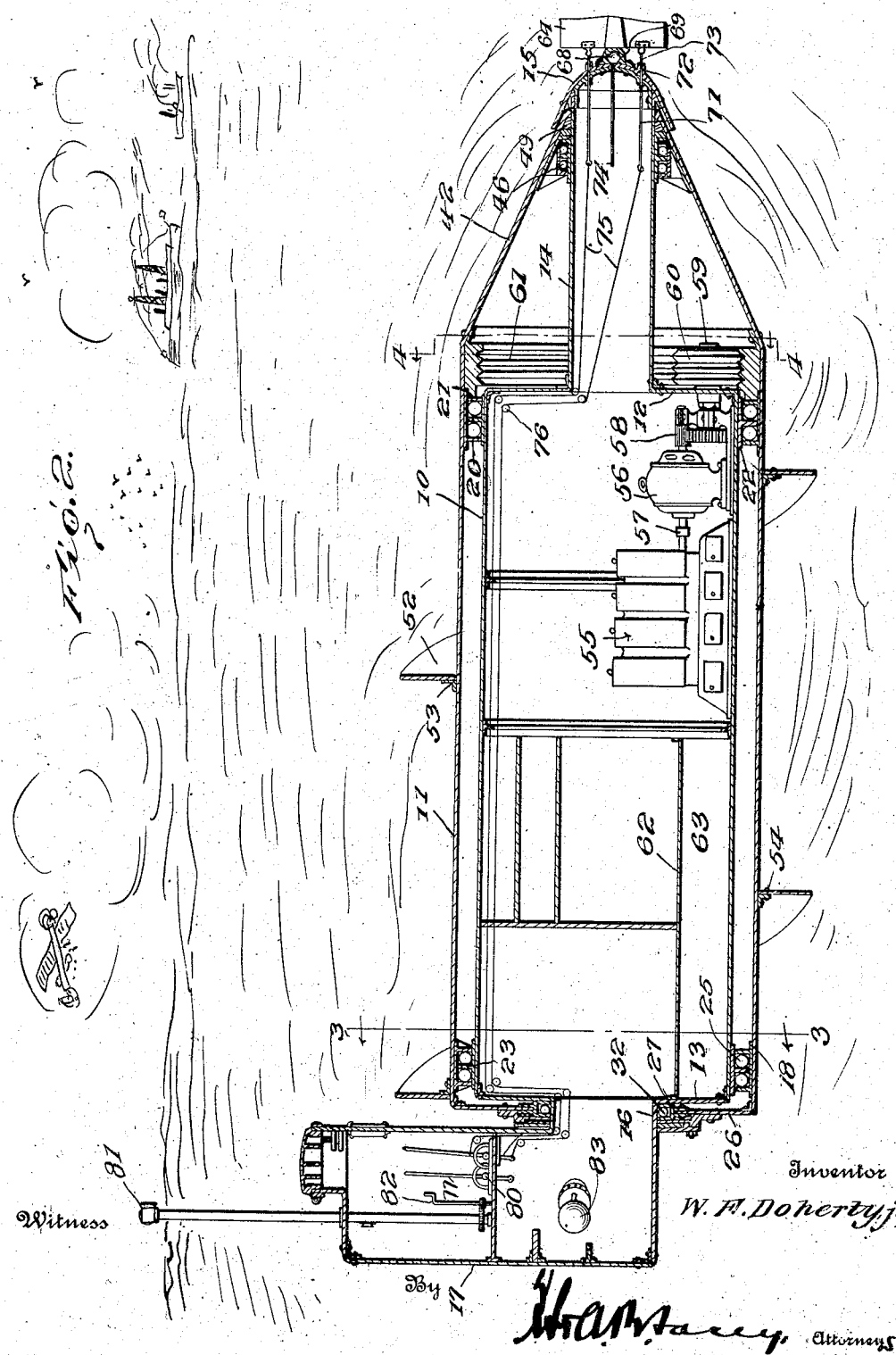

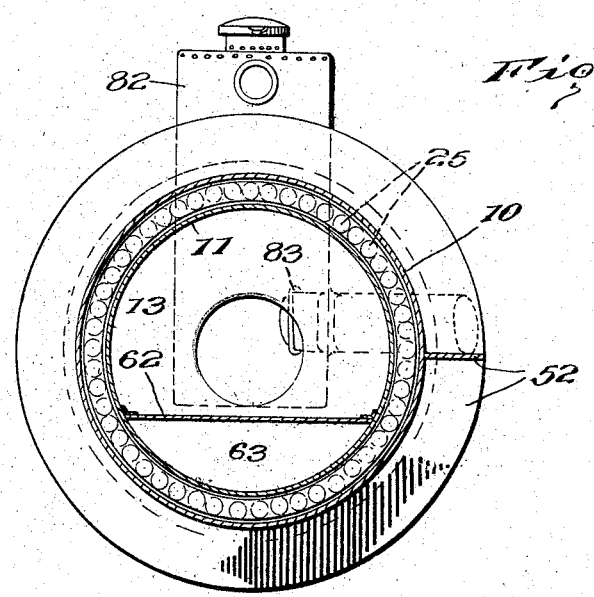
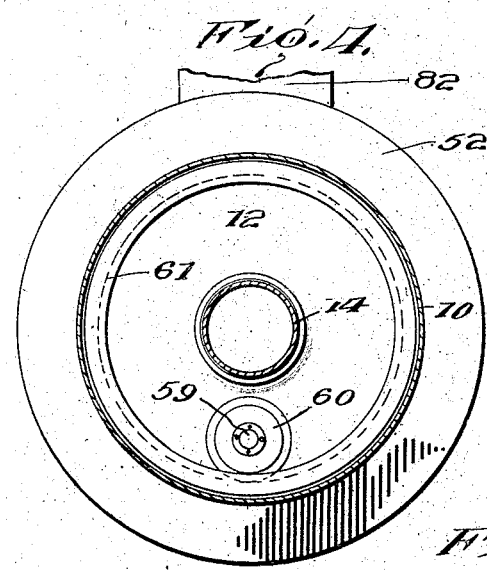
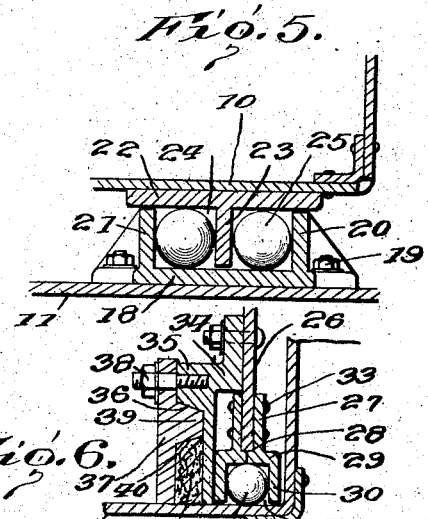
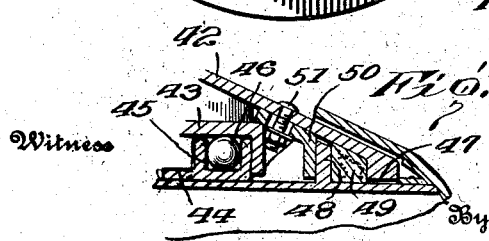

UNITED STATES PATENT OFFICE.

WILLIAM F. DOHERTY, JR., OF BISBEE, ARIZONA.

SUBMARINE BOAT.

1,192,172.

Specification of Letters Patent.

Patented July 25, 1916.

Application filed August 14, 1915. Serial No. 45,563.

*To all whom it may concern:*

Be it known that I, WILLIAM F. DOHERTY, Jr., a citizen of the United States, residing at Bisbee, in the county of Cochise and State of Arizona, have invented certain new and useful Improvements in Submarine Boats, of which the following is a specification.

My invention relates to new and useful improvements in submarine boats, the primary object of my invention being the provision of a boat including an inner shell forming the boat proper and an outer shell revoluble about the inner shell and forming the propeller.

A still further object of my invention consists in the provision of suitable bearing races and bearings between the inner and outer shells, and the further provision of suitable stuffing boxes for preventing entrance of water between the shells although permitting the driving of the outer shell from mechanism contained within the inner shell.

A still further object of my invention consists in the provision of a novel form of friction drive by means of which a more flexible driving system is provided than is ordinarily possible.

A still further object of my invention consists in the provision of a novel form of compound rudder by means of which the boat may be steered in any desired direction and at any desired inclination to the horizontal.

With these and other objects in view, my invention will be more fully described, illustrated in the accompanying drawings, and then specifically pointed out in the claims which are attached to and form a part of this application.

In the drawings: Figure 1 is a side elevation of my improved submarine; Fig. 2 is a central, longitudinal, vertical sectional view, showing the interior construction of the boat; Fig. 3 is a vertical transverse sectional view taken on the line 3—3 of Fig. 2, looking in the direction of the arrows; Fig. 4 is a corresponding view taken on the line 4—4 of Fig. 2; Fig. 5 is a fragmentary sectional view, upon an enlarged scale, of one set of ball races and the ball bearings therein; Fig. 6 is a corresponding view, illustrating one of the stuffing box constructions; Fig. 7 is a similar view, showing another type of stuffing box construction; Fig. 8 is a perspective view, partially diagrammatic, of the rudder and its controlling mechanism.

Corresponding and like parts are referred to in the following description and indicated in all the views of the drawings by the same reference characters.

As will be best seen in Fig. 2 of the drawings, my improved submarine boat includes an inner shell or boat proper 10 and an outer shell or propeller 11. The inner shell is preferably cylindrical in shape and partially closed at each end, as shown at 12 and 13, each end wall of the shell being provided centrally with an opening. A tubular extension 14, which forms the inner portion of the bow of the boat, projects from the end 12 surrounding the opening and carries a substantially conical head plate 15, the free edges of which project rearwardly in spaced relation about the adjacent end of the extension 14.

Surrounding the opening in the rear wall 13 of the inner shell 10 is a cylindrical or tubular portion 16 which, at its outer end, communicates with the vertically disposed conning tower 17 which projects, at its upper end, considerably above the upper level of the body portion 10. The outer shell or propeller 11 is cylindrical in shape throughout the greater portion of its length, being concentrically disposed about the inner shell 10 and of such size as to be spaced somewhat therefrom. The outer shell is provided interiorly adjacent each end of the inner shell with an annular bearing ring 18 which is bolted, as shown at 19, or otherwise suitably secured to the inner face of the outer shell 11 and which is provided with inwardly directed spaced annular flanges 20 and 21. In like manner, the inner shell 10 adjacent each end is provided with a bearing plate 22 formed centrally with an outwardly directed annular rib or flange 23 which seats midway of the flanges 20 and 21, the free edges of the flanges 20 and 21 being just clear of the plate or ring 22, while the free edge of the flange 23 is just clear of the plate or ring 18. By this means, I provide, adjacent each end of the body portion proper of the boat, a pair of annular raceways 24, each adapted to receive a plurality of ball bearings 25 by means of which the outer shell is supported by the inner shell in such a manner that it is free to revolve thereabout. To additionally support the the rear end of the outer shell and also as a means for preventing entrance of water between the shells, at the rear end of the outer shell, I provide a combined bearing race and stuffing box structure, best shown in Fig. 6 of the drawings. The rear end of the outer shell is closed, as shown at 26, its closed end being spaced slightly from the closed end of the inner shell and being formed with an opening concentric with the tubular portion 16 of the inner shell and of somewhat greater diameter.

Secured to the inner and outer faces of the end wall 26 about the opening therein, are rings 27 having, at their free edges, inwardly directed flanges 28 which abut each other and outwardly directed flanges 29 terminating in retaining flanges 30 in such a manner that the flanges 28, 29 and 30 of the two rings co-act to form an annular raceway 31 to receive ball bearings 32, the radial thrust of these bearings being applied directly against the flanges 28 which meet the edge of the end wall 26 and, consequently, directly against the end wall, thereby relieving the rivets 33 or other fastening means of the rings 27 of the greater part of the strain to which they would otherwise be subjected.

Secured to the outer face of the end wall 26, is a clamping ring 34 which extends over the adjacent ring 27 and its flange 30, as shown in Fig. 6, terminating at its inner edge in slightly spaced relation to the tubular portion 16 of the inner shell. This ring, intermediate its length, is thickened by an outwardly projecting annular rib or shoulder 35 having the inner cam face 36 and a second clamping ring 37 is secured against the outer face of this shoulder 35 by bolts or other suitable fastening devices 38. This second clamping plate is formed intermediate its width with an inwardly projecting annular shoulder 39 having a cam face reversely formed to the cam face 36 and adapted for engagement with the cam face 36 and having an opposite cam face 40 so formed that when the clamping rings are drawn together by the bolts 38, a packing 41 interposed between them and the portion 16 of the inner shell will be compressed to firmly engage against the inner shell and prevent leakage between the two shells.

At the bow of the boat, as best shown in Figs. 2 and 7 of the drawings, the outer shell terminates in a frusto-conical extension 42, the smaller end of which seats within the rearwardly directed free edge portion of the conical head plate 15 of the inner shell. This frusto-conical portion 42 is provided upon its inner face and adjacent its smaller end with a bearing plate 43 corresponding to the bearing plate 18 and having similar flanges, while the extension 14 of the inner shell is provided with a co-acting bearing plate 44 corresponding to the bearing plate 22 and having similar flanges, whereby raceways 45 are formed to receive ball bearings 46.

It will of course be understood that all of the above described raceways may be formed in any suitable manner and may, if preferred, be adapted to receive roller bearings or conical bearings in place of the ball bearings specified.

The free end of the frusto-conical extension 42 of the outer shell is thickened to provide an inwardly directed annular shoulder 47, the free edge of which is spaced but slightly from the peripheral face of the extension 14 of the inner shell and the inner shell, adjacent this shoulder, is provided with a co-acting peripheral flange 48. A packing ring 49, of any suitable material, is interposed between the shoulder 47 and flange 48 and is compressed between them by means of a clamping plate 50 so secured to the outer shell by bolts 51 or other suitable fastening devices as to draw the shoulder 47 toward the flange 48. This latter construction is clearly shown in Fig. 7.

Secured to and surrounding the cylindrical portion of the outer shell 11 is a helical propeller blade 52 of any suitable pitch, generally about 30 degrees, and it is this propeller blade which, upon revolution of the outer shell 11 about the inner shell, drives the boat through the water. This propeller blade preferably extends throughout the entire length of the cylindrical portion of the outer shell 11, as clearly shown in the drawings and may be secured to such shell by an angle iron 53 bent into a helix to correspond to the helix of the blade and secured to both the blade and shell by rivets 54 or other suitable fastening devices.

As an alternative means for supplying power to the outer shell, I provide an internal combustion engine 55 of any suitable type and a dynamo 56 which may be driven by the engine to charge storage batteries and which may, when the boat is submerged, be driven as a motor by the batteries to drive the boat, the boat otherwise being driven by the engine 55, any suitable clutch arrangement 57 being interposed between the engine and dynamo to permit this varied use of the two. A train of gears 58, of any suitable character, connects the armature shaft of the motor 56 with a drive shaft 59 which extends through the front wall 12 of the inner shell and which carries a circumferentially grooved friction pinion 60 which engages and drives a circumferentially grooved internal friction gear 61 secured to the inner face of the cylindrical portion of the outer shell 11.

The inner shell is provided with a false bottom 62 forming the floor or a portion of the floor of the boat and the space between this false bottom and the true bottom of the inner shell provides a tank 63 which may be divided into any number of compartments and which is adapted to be utilized for the purpose of submerging the boat, more or less water being pumped into or out of this tank to permit the boat to be submerged or brought to the surface, as desired. This false floor may extend the entire length of the boat or a portion of the length, as shown in the drawings, and it is the weight of such water as may be in the tank 63 and of the driving mechanism of the boat, as well of the various other mechanisms and supplies in the boat and the crew, which prevents turning of the inner shell instead of the outer shell, due to the water resistance to the propeller blade 52. The provision of the frictional drive for the outer shell instead of a direct and positive drive is an important feature as it prevents any likelihood of causing sudden partial turning of the inner shell upon first starting the boat due to the possibility of the water resistance to the turning of the outer shell being greater than the inertia of the inner shell and so renders the boat proper far more stable.

As a means for directing the course of the boat, I provide a rudder which, as best shown in Fig. 8 of the drawings, is substantially cross-shaped in section, being indicated as a whole by the numeral 64. This rudder proper comprises a horizontal rudder blade 65 and vertical rudder blade 66 bisecting each other longitudinally with their forward edges relatively thin to offer little resistance to the water and with their rear edges thickened to give them the necessary strength. A stem 67 projects rearwardly from the central part of the rear end of the rudder 64 and terminates in a ball member 68 adapted to seat in a socket member 69 carried by a post 70 projecting from the apex of the conical plate or head 15, the rudder, of course, being located at the forward end of the boat. A plurality of rods 71 are reciprocally mounted in stuffing boxes 72 formed in the head 15 and at their outer ends are connected by ball and socket joints 73 to the rudder 64. Each rod is connected to the rear edge of one of the blades at one side of the center thereof, two being disposed in a vertical plane with respect to each other and the other two in a horizontal plane with respect to each other. It will, therefore, be seen that one pair of rods will control the swinging of the rudder from right to left and the other pair the swinging of the rudder in a vertical direction. Each of these rods, at its inner end, terminates in an eye 74 and control cables 75 are connected at their ends to these eyes, trained about suitable pulleys 76 and extended to the conning tower 17, being there connected to hand control levers 77. As best shown in Fig. 8 of the drawings, each of these hand control levers co-acts with a notched segment 78, having a hand latch 79 by means of which they may be locked in adjusted position. The cables leading from one of the rudder blades lead to one of the hand levers 77, their ends being connected to the hand lever at points equally at either side of the pivot point 80 of the lever so that as one cable is tightened by a swinging of the lever, the opposite cable will be slackened. In like manner, the cables from the other blade of the rudder are connected to the other hand lever. The stuffing boxes 72, through which the rods project, are so formed as to permit such angular movement of the rods as is necessary to cause proper swinging of the rudder.

The conning tower is, of course, provided with any suitable type of periscope 81 and control mechanism 82 therefor and the lower portion of the conning tower may be provided with torpedo tubes 83. As a matter of fact, my present invention resides in the construction of the boat proper, and the manner of driving and steering it and I do not wish to in any way limit myself to the interior fittings and accessories thereof.

It should be understood that I reserve the right to make any changes, within the scope of the appended claims, without in any way departing from the spirit of my invention.

Having thus described the invention, what is claimed as new is:

1. A submarine boat including an inner shell, an outer shell, the inner shell projecting at its ends through the ends of the outer shell, stuffing box constructions between the inner and outer shells at their ends to prevent entrance of water between the shells, bearing races carried by the shells, ball bearings in the races to support the outer shell for turning movement about the inner shell, a helical propeller blade carried by the outer shell, means for rotating the outer shell respective to the inner shell, a conning tower formed upon one end of the inner shell and exteriorly of the outer shell, a conical head plate secured upon the opposite end of the inner shell and extending rearwardly over the adjacent end of the outer shell, a rudder carried by the head, and means controlled from the conning tower for operating the rudder.

2. A submarine boat including an inner shell, an outer shell, the inner shell projecting at its ends through the ends of the outer shell, stuffing box constructions between the inner and outer shells at their ends to prevent entrance of water between the shells, bearing races carried by the shells, ball bearings in the races to support the outer shell for turning movement about the inner shell, a helical propeller blade carried by the outer shell, means for rotating the outer shell with respect to the inner shell, a conning tower formed upon one end of the inner shell and exteriorly of the outer shell, a conical head plate secured upon the opposite end of the inner shell and extending rearwardly over the adjacent end of the outer shell, a rudder carried by the head, and means controlled from the conning tower for operating the rudder, said means including pivoted hand levers, cables connected at one end to each hand lever above and below its point of pivotal support, rods reciprocally mounted through stuffing boxes in the head to which the opposite ends of the cables are attached, and ball and socket connections between the rods and rudder.

3. A submarine boat including a body terminating at its forward end in a substantially conical head plate formed at its apex with a socket, a rudder including a horizontal blade and a vertical blade formed with a ball member to seat in the socket, whereby the rudder may be swung to either side or up and down, rods reciprocally mounted through the head, ball and socket connections between the rods and rudder blades, a rod being connected to the rear edge of each blade and adjacent each side thereof, hand levers, and operating cables connecting the hand levers and rods.

4. A submarine boat including a cylindrical shell terminating at its forward end in a frusto-conical extension, an inner cylindrical shell terminating at its forward end in a cylindrical extension projecting through the extension of the outer shell, a substantially conical head secured to the extension of the inner shell and projecting over a portion of the extension of the outer shell, a rudder carried by the head, a conning tower projecting from the rear end of the inner shell through the rear end of the outer shell and above the upper portion of the outer shell, means between the inner and outer shells adjacent their ends to prevent entrance of water between the shells, ball bearings located between the shells to support the outer shell for turning movement with respect to the inner shell, means for rotating the outer shell with respect to the inner shell, and a propeller blade carried by the outer shell.

5. A submarine boat including an outer cylindrical shell terminationg at its forward end in a frusto-conical extension, an inner cylindrical shell terminating at its forward end in a cylindrical extension projecting through the extension of the outer shell, a substantially conical head secured to the extension of the inner shell and projecting over a portion of the extension of the outer shell, a rudder carried by the head, a conning tower projecting from the rear end of the inner shell through the rear end of the outer shell and above the upper portion of the outer shell, means between the inner and outer shells adjacent their ends to prevent entrance of water between the shells, ball bearings located between the shells to support the outer shell for turning movement with respect to the inner shell, means for rotating the outer shell with respect to the inner shell, a propeller blade carried by the outer shell, and a false bottom within the inner shell providing a water receiving tank.

6. A submarine boat including an inner shell, an outer shell, the inner shell projecting at its ends through the ends of the outer shell, a conical head plate carried by the forward end of the inner shell and overlapping the forward end of the outer shell, a helical propeller blade carried by the outer shell, and means for rotating the outer shell with respect to the inner shell.

7. A submarine boat including an inner shell, an outer shell, the inner shell projecting at its ends through the ends of the outer shell, a helical propeller blade carried by the outer shell, means for rotating the outer shell with respect to the inner shell, and a rudder carried by the forward end of the inner shell, the rudder being adapted to direct the boat in both horizontal and vertical planes.

In testimony whereof I affix my signature.

WILLIAM F. DOHERTY, Jr. [L. S.]

Copies of this patent may be obtained for five cents each, by addressing the "Commissioner of Patents, Washington, D. C."